Figure 1:
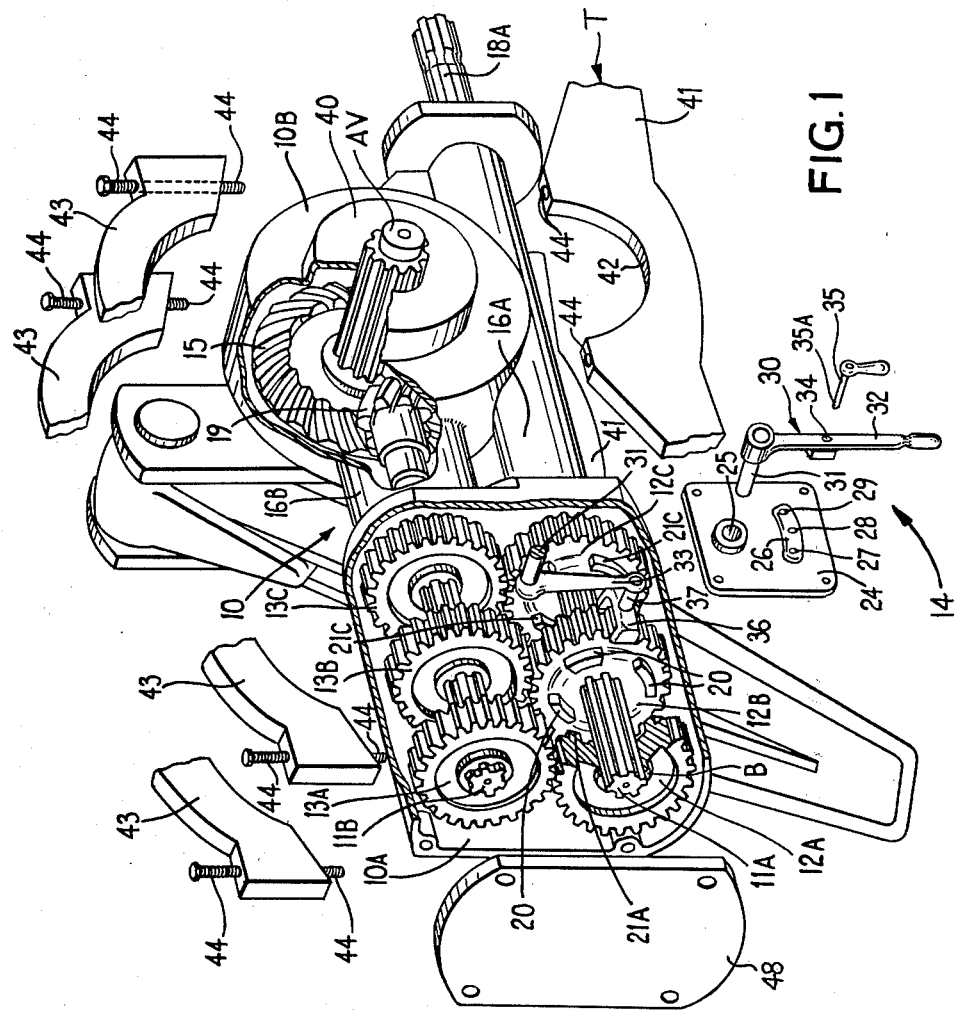

United States Patent [19]

Tortella

[11] 4,391,154

[45] Jul. 5, 1983

[54] VARIABLE SPEED DIGGING MACHINE PROVIDED WITH A GEARBOX HAVING AN ORIENTABLE DRIVE

[76] Inventor: Michele Tortella, Zona Industrial, Madonna delle Grazie-Ortona (Chieti), Italy

[21] Appl. No.: 147,219

[22] Filed: May 6, 1980

[30] Foreign Application Priority Data

May 11, 1979 [IT] Italy .............................. 49033 A/79

[51] Int. Cl.³ .................... F16H 37/00; F16H 3/22; F16H 57/02
[52] U.S. Cl. .................................. 74/15.4; 74/606 R; 74/342; 172/125
[58] Field of Search .................. 74/342, 606 R, 416, 74/417, 333, 359, 15.4; 172/125, 57, 95, 88, 45, 118, 123; 180/53 C

[56] References Cited

U.S. PATENT DOCUMENTS

| 810,634 | 1/1906 | Flather | 74/333 |
| 1,475,455 | 11/1923 | Skinner et al. | 172/125 |
| 2,051,694 | 8/1936 | Fishleigh | 172/125 |
| 2,821,868 | 2/1958 | Gregory | 74/359 |
| 2,957,529 | 10/1960 | Kaller | 172/123 |

*Primary Examiner*—Kenneth Dorner
*Attorney, Agent, or Firm*—Bacon & Thomas

[57] ABSTRACT

An improved digging machine for operation with the power takeoff of a tractor wherein the digging machine includes a gearbox that permits the machine to operate at different speeds independent of the tractor speed in order to accommodate varying ground conditions while maintaining constant sod width. The gearbox includes first and second gear shafts, with the first gear shaft being driven by the power takeoff and transmitting its motion to the second gear shaft through respective first and second gear sets, with the second gear shaft driving at least one hoe-driving shaft. The corresponding gears of the first and second gear sets are selectively engageable to provide plural speed settings, thereby permitting variation of the frequency of the hoe strokes within a wide range. The gearbox is movably orientable on the frame of the digging machine in a vertical plane about the longitudinal axis of the frame in order to accommodate tractors having power takeoffs disposed at different heights.

12 Claims, 2 Drawing Figures

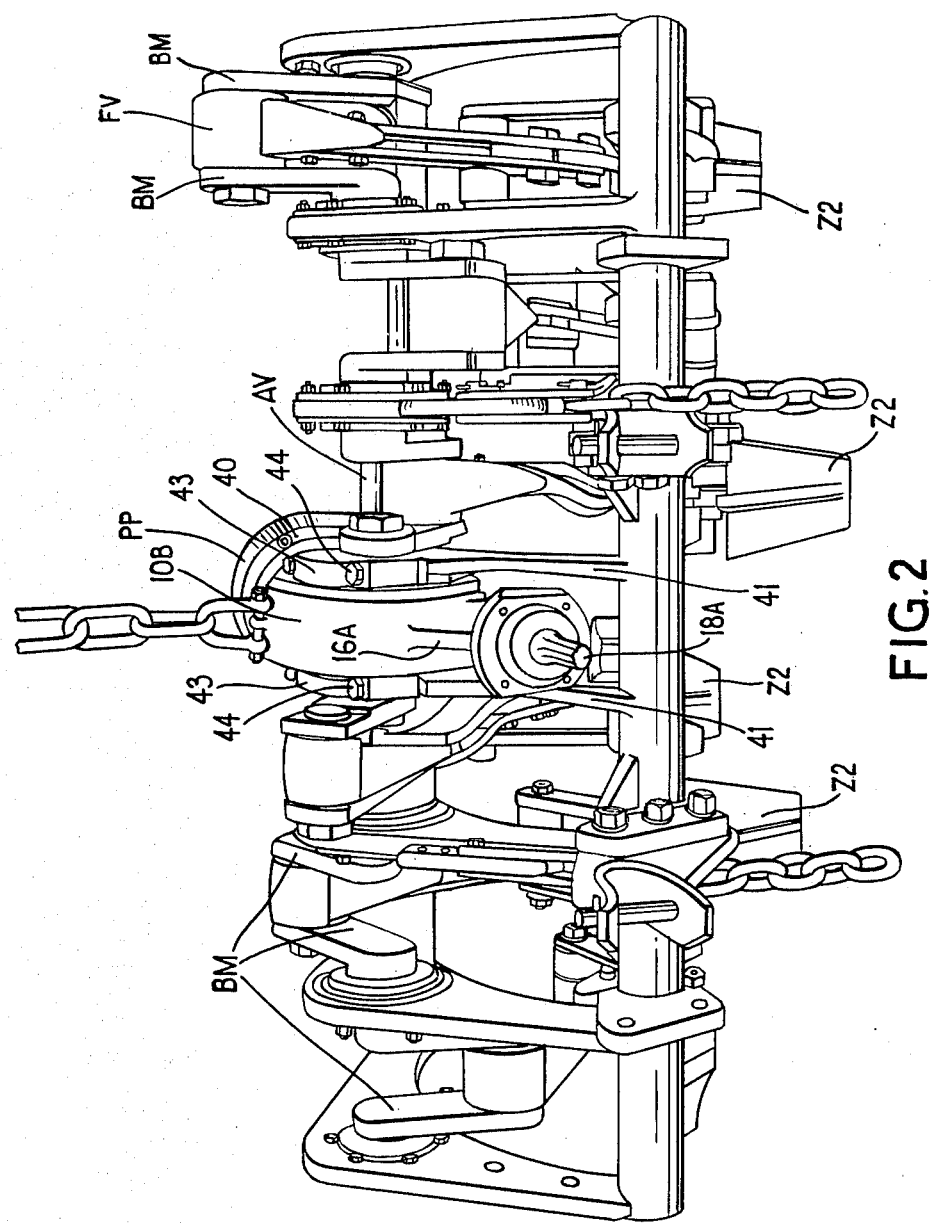

VARIABLE SPEED DIGGING MACHINE PROVIDED WITH A GEARBOX HAVING AN ORIENTABLE DRIVE

This invention refers to an improved variable speed digging machine provided with a gearbox having an orientable drive.

In digging machines used heretofore the drive is transmitted by the tractor power take-off through a universal joint to a main shaft or drive which in turn drives the hoe driving shaft perpendicular thereto through a pair of bevel gears. In digging machines of this type the drive shaft speed is suitably reduced to the value of normal speed of the hoe driving shaft.

Accordingly, these machines have a single operative speed so that changing the tractor speed there is a change also in the size of the sods in the direction of movement of the tractor. Thus, the width of the sods decreases as the tractor speed slows down, for example on sloping areas. In conclusion, since the tractor speed cannot be practically maintained constant even if the tractor is provided with a speed gear, the drawback of the different sod width is not overcome.

According to the invention, the above-mentioned drawback is overcome by equipping the digging machine with a speed gearbox mounted between the drive shaft and the main shaft driving the hoe driving shaft of the digging machine. Thus, by suitably varying the gear ratio it is possible to obtain sods of constant width independently of the tractor speed which inevitably changes according to the nature and slope of the area to be dug.

A primary advantage of the digging machine of the invention is the possibility of varying the frequency of the hoe strokes within a wide range, thus making it possible to select the sod width according to the nature of the soil cultivation.

In other words, the digging machine of the invention allows the sod width to be correlated to the nature of the soil, thus forming sods of the desired size independently of the soil slope and compactness. Thus, the soil can be loosened as desired for a better exploitation thereof.

As mentioned above, these results are obtained by providing a speed gearbox between the digging machine main shaft and the drive shaft of the tractor so that the hoe driving shaft receiving the movement of the main shaft can rotate at different speeds.

According to a preferred embodiment of the invention, three speeds are available, and obtained through three pairs of gears suitably mounted on the main shafts and drive shafts journalled in a suitable gearbox.

Moreover, the invention has the further advantage of the gearbox being pivotally mounted on its support and, accordingly, the drive shaft can be oriented in the vertical plane. This allows the digging machine to be used with different types of tractors by connecting the drive shaft to the power take-off of the tractor regardless of the height of the power takeoff.

The digging machine of the invention is provided with a gearbox substantially comprising a support mounted on a machine frame, a gearbox adapted to be mounted on a support for varying the angle thereof in the vertical plane, a drive shaft journalled in the gearbox and protruding outwardly therefrom, which drive shaft is adapted to be connected to the power take-off of the tractor driving the digging machine and is the gearbox main shaft, a first gear splined to the main shaft inside the gearbox and axially movable thereon, a pair of gears idly mounted on the main shaft at the opposite sides of the splined gear, a second shaft journalled in parallel relationship with the first shaft in the gearbox and protruding outwardly therefrom for a certain length, which shaft is the secondary shaft of the gearbox, three gears splined to the secondary shaft inside the gearbox, and a control mechanism mounted on the wall of the gearbox and acting on the gear splined to the gearbox main shaft.

The gearbox support is of the collar type and comprises two bases integrally formed with the machine frame and two "caps" adapted to be secured thereon by tightening inbetween suitable cylindrical embossments integrally formed with the gearbox.

The invention will be now described in detail with reference to the annexed drawings, wherein:

FIG. 1 is a partially sectional view of the gearbox arrangement in the digging machine of the invention; and, FIG. 2 is an overall perspective view of the digging machine.

With reference to FIG. 1, the gearbox equipping the digging machine substantially comprises: an elongated gearbox housing indicated at 10; two shafts 11A and 11B journalled in the gearbox housing; two sets of gears, each set comprising three gears, mounted on shafts 11A and 11B, respectively, and indicated by 12A, 12B, 12C and 13A, 13B, 13C; and, a gearbox control mechanism indicated by 14.

The gearbox housing comprises a first housing 10A receiving the gears and a second housing 10B receiving the bevel gear pair of the digging machine indicated by 15 and integrally formed with shaft AV driving hoes Z2. The two housings 10A and 10B are connected and held together by two parallel spaced tubular bodies indicated at 16A and 16B.

Shaft 11A is received within lower tubular body 16A, the inner length thereof being received within housing 10A and end 18A protruding outwardly of the tubular body in order to be connected to the tractor power take-off (not shown).

Shaft 11B is received within upper tubular body 16B, its inner length being received within housing 10A and its outer end carrying a bevel pinion 19 received within housing 10B and meshed with bevel gear pair 15 of the digging machine driving shaft AV, which driving shaft is fitted through two axial holes suitably drilled in the housing.

Gear 12B is splined to shaft 11A as to rotate therewith. However, gear 12B is free to slide axially on shaft 11A and has on each annular face three arcuated axially directed teeth 20, which teeth are angularly spaced by 120°.

Side gears 12A and 12C are also mounted on shaft 11A. However, they are locked against axial movement on shaft 11A, but are permitted to freely rotate with respect thereto in any manner well known in the art and deemed suitable for the practice of this invention. Gears 12A and 12C each have three axially directed teeth 21A and 21C protruding from their annular faces, which teeth are identical with axially directed teeth 20 and are similarly spaced.

Three gears 13 (A, B and C) are fitted on the length of shaft 11B inside housing 10A and they are keyed thereto as to be locked against both rotation and axial movement with respect thereto in any manner well known in the art and deemed suitable for the practice of this invention. Side gears 13A and 13B of shaft 11B are meshed with corresponding side gears 12A and 12B.

A plate 24 is welded on side wall 22 of housing 10A and has a hole 25 and an arcuated section 26 presenting three uniformly spaced holes 27, 28 and 29.

Plates 24 and a U-shaped member 30 together comprise the gearbox control mechanism.

U-shaped member 30 comprises a central spindle 31, an outer arm 32 and an inner arm 33. Outer arm 32 has a through hole 34 receiving a locking pin 35, an end 35A of which is adapted to be received into holes 27, 28 and 29 of plate 24.

Free end 36 of inner arm 33 is fork-shaped and embraces the outer periphery of gear 12B. Stem 37 of fork-shaped end 36 can freely rotate in respect of inner arm 33.

Gearbox housing 10 is mounted on frame T of the digging machine through cylindrical embosments 40 which are received on bases 41 integrally formed with the frame. Bases 41 are each provided with a cylindrical seat 42 having the same diameter as embosments 40. Cylindrical embosments 40 are then gripped on bases 41 through "caps" 43 connected to bases 41 through bolts 43 which are screwed tight into holes 44.

The operation of the digging machine described and illustrated above is very simple.

Since the gearbox equipping the digging machine comprises three pairs of gears, by suitably selecting the gear diameters the rotational movement of the tractor power take-off can be transmitted to the digging machine driving shaft AV with three different ratios which will be selected by suitably positioning U-shaped member 30.

Accordingly, the digging machine can be adapted to three different conditions of the area nature and slope without changing the results of the digging operation.

More particularly, with the above-described arrangements there are three possibilities, i.e.:

(A) When U-shaped member 30 is placed in the position corresponding to hole 28 shaft 11A will drive shaft 11B and accordingly the digging machine driving shaft AV through gears 12B and 13B, while gears 12A and 12C do not rotate. In this position U-shaped member 30 can be locked in place through locking pin 35 fitted into hole 34 and then into hole 28;

(B) when U-shaped member 30 is angularly moved counterclockwise in the figure, due to fork-shaped end 36 embracing gear 12B, gear 12B will disengage from gear 13B thus moving to the right against gear 12C so that axially directed teeth 20 and 21C mesh together, then keying gear 12C to shaft 11A through gear 12B. Accordingly, the drive of shaft 11A is transmitted to shaft 11B and then to the digging machine driving shaft AV through gears 12C and 13C. In this position control member 30 can be locked in place through locking pin 35 fitted into hole 34 and then into hole 29; and, (C) when U-shaped member 30 is angularly moved clockwise in the figure, due to fork-shaped end 36 embracing gear 12B, gear 12B will disengage again from gear 13B thus moving to the left engaging gear 12A, so that the drive of shaft 11A will be transmitted to shaft 11B and then to the digging machine driving shaft AV through gears 12A and 13A. In this position control member 30 can be locked by locking pin 35 in the position corresponding to hole 27.

From the foregoing it is evident that the unit comprising the drive shaft, the gearbox and the bevel gear pair is an integral unit received and supported in housings 10A, 10B and in tubular bodies 16A and 16B. This integral unit can be mounted on the digging machine so that shaft 11A can be differently oriented in the vertical plane through cylindrical embosments 40 integrally formed with housing 10B, which embosments allow housing 10A to rotate on collar-shaped supports comprising bases 41 and "caps" 43.

From the foregoing it is evident that the digging machine as described and illustrated is an extremely versatile implement having hereto-fore unknown operational characteristic. These characteristics can be modified by replacing the three pairs of gears mounted on shafts 11A and 11B, which gears are readily accessible upon removal of a cover 48.

I claim:

1. In a digging machine including a longitudinal frame supporting at least one hoe-driving shaft driven by a main drive shaft for coupling to the power takeoff of a tractor operating the digging machine, the improvement comprising:
   (a) an elongate gearbox carried by the machine;
   (b) means for supporting the elongate gearbox for movable orientation in a vertical plane about the longitudinal axis of the machine;
   (c) the gearbox supporting the main drive shaft of the machine and interposed between the main drive shaft and the hoe-driving shaft;
   (d) a first gear shaft connected to and driven by the main drive shaft;
   (e) a second gear shaft for driving the hoe-driving shaft;
   (f) the first and second gear shafts being journaled through the gearbox;
   (g) a first gear set including three gears mounted on the first gear shaft;
   (h) a second gear set including three gears mounted on the second gear shaft; and
   (i) each gear of the second gear set being engageable with and selectively driven by a corresponding gear of the first gear set, with the diameters of the corresponding gears being such that the second gear shaft may be driven by the first gear shaft at any one of three different speeds depending upon which corresponding gears of the first and second gear shafts are in selected driving engagement with each other for transmitting the motion of the first gear shaft to the second gear shaft.

2. The digging machine of claim 1 further including means for selectively placing corresponding gears of the first and second gear sets in driving engagement with each other.

3. In a digging machine including a longitudinal frame supporting at least one hoe-driving shaft driven by a main drive shaft for coupling to the power takeoff of a tractor operating the digging machine, the improvement comprising:
   (a) an elongate gearbox carried by the machine and movably orientable in a vertical plane about the longitudinal axis of the machine;
   (b) the gearbox supporting the main drive shaft of the machine and interposed between the main drive shaft and the hoe-driving shaft;
   (c) a first gear shaft connected to and driven by the main drive shaft;
   (d) a second gear shaft for driving the hoe-driving shaft;
   (e) the first and second gear shafts being journaled through the gearbox;

(f) a first gear set including plural gears mounted on the first gear shaft;

(g) a second gear set including plural gears mounted on the second gear shaft;

(h) each gear of the second gear set being engageable with and selectively driven by a corresponding gear of the first gear set, with the diameters of the corresponding gears being such that the second gear shaft may be driven by the first gear shaft at any one of three different speeds depending upon which corresponding gears of the first and second gear shafts are in selected driving engagement with each other for transmitting the motion of the first gear shaft to the second gear shaft;

(i) a bevel gear carried by the hoe-driving shaft; and (j) a pinion gear carried by the second gear shaft and in engagement with the bevel gear for transmitting the motion of the second gear shaft to the hoe-driving shaft.

4. The digging machine of claim 3 wherein the gearbox includes:

(a) a first housing for containing the first and second gear sets; and (b) a second housing for containing the bevel gear and the pinion gear.

5. The digging machine of claim 4 further including:

(a) first and second tubular casings disposed in parallel for securing the first and second housings together; and wherein (b) the main drive shaft and the first gear shaft are disposed within the first tubular casing, with a portion of the main drive shaft extending outwardly therefrom for connection to the tractor power takeoff; and (c) a portion of the second gear shaft is disposed within the second tubular housing.

6. In a digging machine including a longitudinal frame supporting at least one hoe-driving shaft driven by a main drive shaft for coupling to the power takeoff of a tractor operating the digging machine, the improvement comprising:

(a) an elongate gearbox carried by the machine and movably orientable in a vertical plane about the longitudinal axis of the machine;

(b) the gearbox supporting the main drive shaft of the machine and interposed between the main drive shaft and the hoe-driving shaft;

(c) a first gear shaft connected to and driven by the main drive shaft;

(d) a second gear shaft for driving the hoe-driving shaft;

(e) the first and second gear shafts being journaled through the gearbox;

(f) a first gear set including two end gears and a central gear splined to the first gear shaft in a first linear array wherein the central gear of the linear array is slidable along a first gear shaft between the two end gears, with each face of the central gear being provided with a plurality of angularly spaced teeth, and the end gears of the first linear array being freely rotatable with respect to but secured against sliding movement along the first gear shaft, with an inner face of each end gear being provided with a plurality of angularly spaced teeth engageable with the angularly spaced teeth on a corresponding face of the central gear;

(g) a second gear set including three gears mounted on the second gear shaft; and (h) each gear of the second gear set being engageable with and selectively driven by a corresponding gear of the first gear set, with the diameters of the corresponding gears being such that the second gear shaft may be driven by the first gear shaft at any one of three different speeds depending upon which corresponding gears of the first and second gear shafts are in selected driving engagement with each other for transmitting the motion of the first gear shaft to the second gear shaft.

7. The digging machine of claim 6 wherein:

(a) the second gear set include two end gears and a central gear splined to the second gear shaft in a second linear array and secured against both rotary movement with respect to and sliding movement along the second gear shaft; and (b) each end gear of the second gear set is in meshed engagement with a corresponding end gear of the first gear set.

8. The digging machine of claim 7 further including means for selectively placing corresponding gears of the first and second gear sets in driving engagement with each other.

9. The digging machine of claim 8 wherein the means for selectively placing corresponding gears in driving engagement with each other includes:

(a) a U-shaped member for sliding the central gear of the first gear set along the first gear shaft into any one of three positions whereby corresponding gears of the first and second gear sets may be selectively placed in driving engagement with each other; and (b) means for securing the U-shaped member in any one of the three positions.

10. The digging machine of claim 9 wherein the means to secure the U-shaped member in any one of the three positions includes:

(a) a plate carried by the first housing and including three spaced apertures therein; and (b) a locking pin engageable with the U-shaped member and either of the three apertures in the plate.

11. The digging machine of claim 10 wherein the U-shaped member includes:

(a) a central spindle;

(b) an outer arm disposed exteriorly of the first housing;

(c) an inner arm disposed interiorly of the first housing;

(d) the outer arm including a hole through which the locking pin is received;

(e) the inner arm includes a rotatable fork-shaped member which embraces the outer periphery of the central gear of the first gear set; and wherein (f) rotation of the central spindle permits the central gear of the first gear set to selectively engage the central gear of the second gear set or either end gear of the first gear set.

12. In a digging machine including a longitudinal frame supporting at least one hoe-driving shaft driven by a main drive shaft for coupling to the power takeoff of a tractor operating the digging machine, the improvement comprising:

(a) an elongate gear box including opposed cylindrical-shaped portions integrally formed therewith carried by the machine and movably orientable in a vertical plane about the longitudinal axis of the machine;

(b) the frame includes a pair of opposed vertical plates, with each vertical plate including a semicircular seat on a free edge thereof;

(c) each cylindrical portion of the gearbox housing being disposed within a corresponding semicircular seat;

(d) a pair of locking plates, with each locking plate including a correspondingly shaped semicircular seat engageable with a cylindrical-shaped portion and its corresponding vertical plate for securing the gearbox housing to the frame;

(e) the gearbox supporting the main drive shaft of the machine and interposed between the main drive shaft and the hoe-driving shaft;

(f) a first gear shaft connected to and driven by the main drive shaft;

(g) a second gear shaft for driving the hoe-driving shaft;

(h) the first and second gear shafts being journaled through the gearbox;

(i) a first gear set including plural gears mounted on the first gear shaft;

(j) a second gear set including plural gears mounted on the second gear shaft; and (k) each gear of the second gear set being engageable with and selectively driven by a corresponding gear of the first gear set, with the diameters of the corresponding gears being such that the second gear shaft may be driven by the first gear shaft at any one of three different speeds depending upon which corresponding gears of the first and second gear shafts are in selected driving engagement with each other for transmitting the motion of the first gear shaft to the second gear shaft.

* * * * *